Aug. 4, 1931.  C. LOFMAN  1,817,087
APPARATUS FOR CONNECTING COILED SPRING MEMBERS
Filed Feb. 1, 1930  2 Sheets-Sheet 1
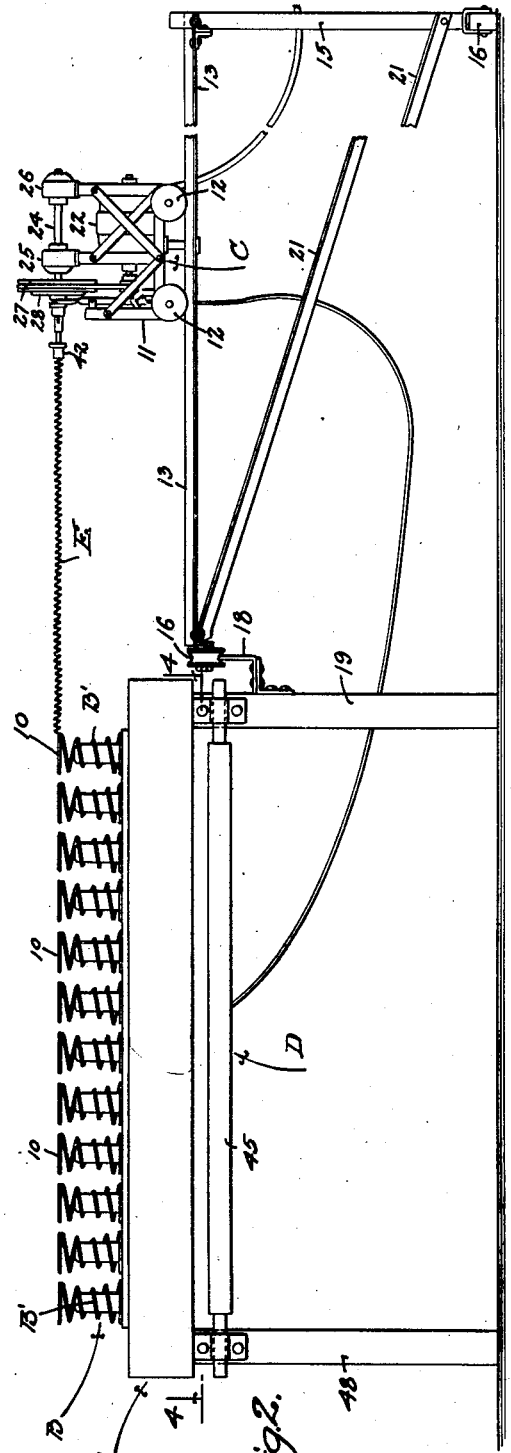
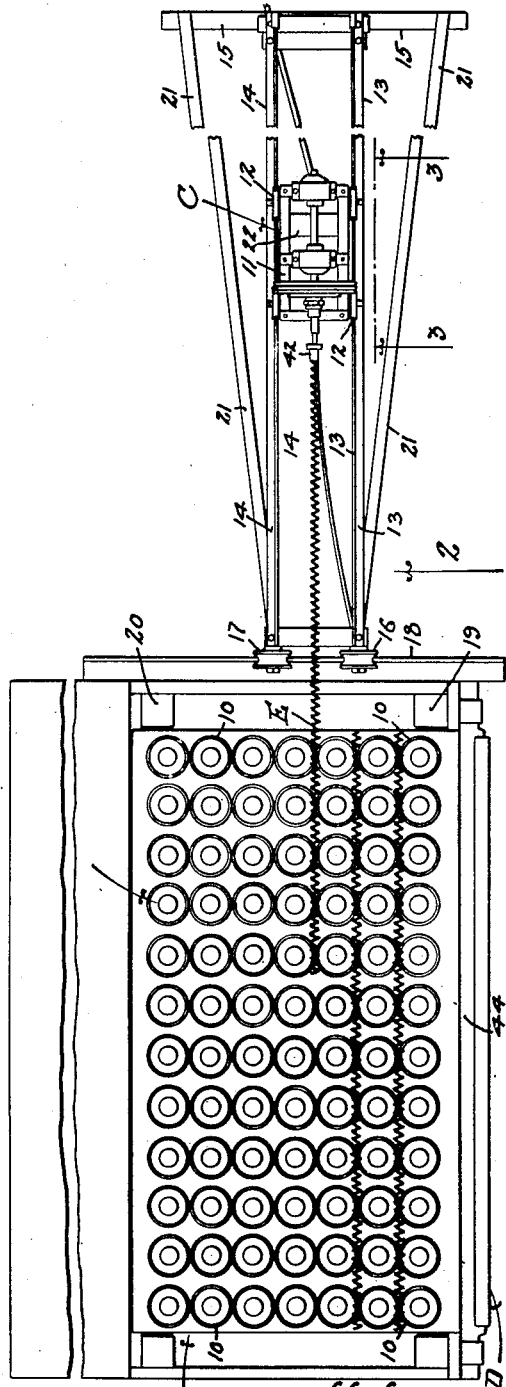
INVENTOR
CHARLES LOFMAN
By
ATTORNEY Aug. 4, 1931.　　　　C. LOFMAN　　　　1,817,087
APPARATUS FOR CONNECTING COILED SPRING MEMBERS
Filed Feb. 1, 1930　　　2 Sheets-Sheet 2
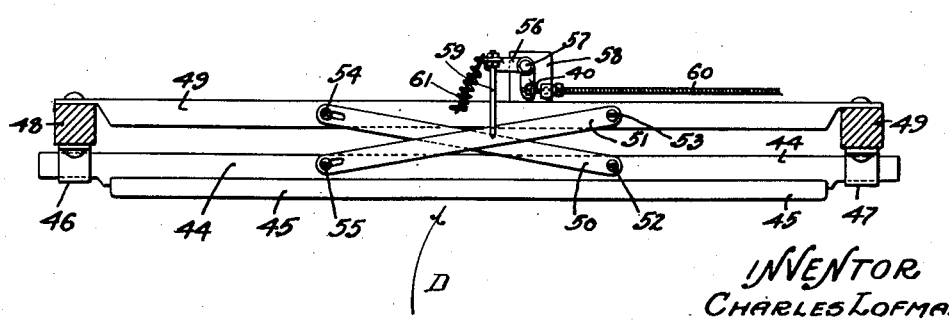

Patented Aug. 4, 1931

1,817,087

UNITED STATES PATENT OFFICE

CHARLES LOFMAN, OF LOS ANGELES, CALIFORNIA, ASSIGNOR TO ROBERTI BROS., A CORPORATION OF CALIFORNIA

APPARATUS FOR CONNECTING COILED SPRING MEMBERS

Application filed February 1, 1930. Serial No. 425,195.

This invention relates to the fabrication of coiled spring supporting units, and deals with an apparatus designed and adapted for the purpose of connecting spring coils into a spring supported area.

In fabricating units of coiled springs, such as are contemplated by this invention, and which may be further identified as the type of spring units used in manufacturing inner coil mattresses, overstuffed furniture, and, in fact, any place a spring-supported area may be utilized, the common practice has been to connect the tops and bottoms of the supporting spring by means of a small continuous helical coil running from side to side or from end to end of the spring supported area. The method of inserting the small helical coil heretofore has employed two operators, one of whom rotates the coil by means of any suitable mechanical device in a manner to cause the coil, by means of the screw-threaded form, to advance through and around the top members of the supporting springs, the other operator guides the end of the coil in a manner to insure proper engagement of the required parts. Under this arrangement, it is necessary to repeatedly start and stop the rotation of the helical coil due to the many points of engagement and the necessity of the proper alignment of the upper members of the supporting springs. With two operators employed, a set of signals could be utilized, but even this arrangement has been found objectionable in view of the personal equation which enters into all manually operated mechanism.

Perceiving that a great deal of unnecessary time and labor was wasted in the employment of two operators, I conceived the possibility of driving the helical coil by power means and in conjunction therewith providing a sensitive clutch and a clutch control for stopping or starting the rotation of the coil. With this arrangement, only one operator becomes necessary to feed the coil through the spring arrangement and with my especially designed clutch and clutch control the operator may regulate the rotation of the coil as may be required. By utilizing power means, it is obvious that a higher speed of rotation may be imparted to the helical coil, and that the stopping and starting of the coil may be more quickly effected.

The means contemplated by this invention embodies a source of power for imparting the rotative movement to a helical coil together with a clutch means for engaging or disengaging the coil with the motive power and a means of operating said clutch controllable by the operator from various positions along the table as he follows the course of the rotating coil in its travel through the coiled spring arrangement. It accordingly becomes an object of this invention to provide a power driven apparatus of the character described which may be operated and controlled by a single operator as and for the purpose set forth.

It is a further object of this invention to provide in a device of the character described a traveling source of power arranged to drive a helical coil through an arrangement of coil springs as described and track means which permit said source of power to follow and drive said coil through said spring arrangement.

Another object of the invention resides in the provision of a clutch arranged upon said traveling power source and means of remotely controlling said clutch, said means being arranged in a manner to be accessible to an operator at all points along the course of travel of said helical coil.

Other objects and advantages will appear in the description when taken in conjunction with the drawings in which Fig. 1 is a plan view showing a coiled spring arrangement and the manner of inserting a continuous helical coil as an interlocking member between said supporting coil springs with my invention embodied therewith;

Fig. 2 is an end elevation of the same taken on line 2—2 of Fig. 1;

Fig. 3 is an enlarged fragmentary view taken substantially on line 3—3 of Fig. 1; and Fig. 4 is a section showing the clutch control mechanism taken substantially on line 4—4 of Fig. 2.

In the drawings, I have shown a conventional work table designated A, and having the usual spool arrangement designated B for arranging coiled springs B' preliminary to fabricating such springs into a coiled spring unit. After having placed the coiled springs B' upon their respective spools, the next step consists in connecting the top members 10 of the coiled springs by rotating a continuously helically coiled member E around said members. For this purpose my invention provides a power unit generally designated C and means for operably controlling said power unit generally designated D. More specifically describing the means designated C, it is seen to comprise a frame generally designated 11 and provided with track wheels 12 arranged to ride track members 13 and 14. The track members 13 and 14 in this instance are shown as angle irons supported at the outer end upon a suitable leg supporting member 15 provided at its floor-engaging end with rollers 16. The inner ends of the tracks 13 and 14 are mounted upon rollers 16 and 17, respectively, which, in turn are arranged to ride upon a track 18 that is suitably supported upon the legs 19 and 20 of the table A. A suitable brace member 21 is provided between the inner ends of the tracks 13 and 14 and the lower end of the leg supporting member 15 which produces a rigid supporting structure.

The foregoing arrangement will be appreciated as providing a means for mounting a source of power, which is characterized by having movement in two directions. This combination of movements will be appreciated as supplying the required movements necessary for inserting a spring of the character described.

The frame 11 is arranged and adapted to support an electric motor 22 which is provided with a drive pulley 23. Mounted upon the upper part of the frame 11 is a shaft 24 suitably journaled as shown at 25 and 26. Loosely mounted upon the shaft 24 I have provided a driven pulley 27. The pulley 27 is arranged to rotate continuously in connection with the motor 22 by means of a belt 27'. As a means of rotating the shaft 24 in response to the requirements of the operator, I have provided a clutch comprising a disk 28 having a hub 29 suitably splined on the shaft 24 as shown at 30.

The plate 28 is adapted to be brought into and out of engagement with the face 31 of the pulley 27, and for this purpose I have provided a fork member 32 arranged to ride in a slot 33 in the hub 29, said fork member being pivoted at 34 upon the frame 11. Means is provided for operating said fork member 32 upon the pivot 34 and comprises a pair of link member 35 and 36 pivotally moutned upon the fork member 32 and an upstanding lug member 37, respectively. The lug member 37 will be understood to be part of the frame 11. The links 35 and 3 are pivotally interengaged as shown at 38 Means is provided for operating said link in a manner to rotate the fork member 3 upon the pivot point 34 and, as shown, consists of a link 39 pivotally engaging the pivo point 38 and a tension member 40 arrange to exert a downward pull on the links 35 and 36 and cause the fork member 32 to rotat clockwise upon the pivot 34 and thus effec an engagement of the plate 28 and the fac 31 of the pulley 27. Spring means 41 is provided for normally holding the plate 28 awa from the face 31. This type of clutch wil be recognized as providing movement onl under positive engagement, which engage ment must be initially caused by the opera tor. Chuck means is provided for connecting the helically coiled spring E to the source o power and consists of a sleeve 42 mounted upon a pin 43 which is a part of the shaf 24. The pin 43 may be provided with a taper, or the sleeve 42 may have a taper, o both may be slightly tapered. It is clear tha with the taper on the pin, or the sleeve, tha the loose end of the helical spring E may be inserted around the pin 43, and the sleev 42 may then be pulled back over the spring F and effect a clamping engagement between the pin 43 and the sleeve 42. This type of chuck has been found satisfactory in practice, but I do not wish to confine myself to this particular clutch as any other suitable expedient is acceptacle in so far as invention is concerned.

In order that the engagement or disengagement of the shaft 24 with the motive power may be remotely controlled, I have provided the foregoing described clutch mounted upon the frame 11 which is adapted to travel with the source of power upon the tracks 13 and 14, and having shown said clutch to be operable by the tension member 40, it remains to supply means for applying tension to the member 40. Such means has been designated D in its entirety. More specifically describing such means, it is seen to comprise a push bar 44 arranged on the table A in a manner to be engageable by the knee of an operator. For this purpose, the bar may be padded as shown at 45. The ends of the bar 44 are slidably mounted in clamp members 46 and 47 suitably fastened to legs 19 and 48 of the table A. On the inner side of the legs 19 and 48, I have provided a piece of angle iron 49 attached to the legs 19 and 48 substantially at the same level as the bar 44. Connecting the bar 44 and the angle iron 49, I have provided a pair of link members 50 and 51 pivotally mounted on the bar 44 and the angle iron 49, as shown at 52 and 53, respectively. The bars 50 and 51 cross substantially at their mid-section and have their opposite ends slidably mounted upon the members 49 and 44 as shown at 54 and 55, respectively. This arrangement will be recognized as providing a structure wherein relatively parallel movement may be had on the member 44 with respect to the member 49 by pressure at any point on the bar 44. The bar 44 is to be understood as providing a means whereby the operator may operate the clutch from any point along the side of the table A.

It is evident from the foregoing arrangement that as the bar 44 is pressed inwardly toward the bar 49, the links 50 and 51 change relative position and approach the bar 49. In order to take advantage of this movement, I have provided an arrangement including a bell crank 56 suitably mounted upon a pivot 57 which is supported upon a bracket 58 that may be mounted upon the bar 49. One end of the bell crank 56 is connected to the bar 51 by means of a push rod 59. The other end of the bell crank 56 is connected to the tension member 40 which tension member operates through a flexible casing 60 and is thus seen to provide a conventionally flexible push and pull connection between the bell crank 56 and the link arrangement 35 and 36.

Spring means is provided for holding the push bar 44 in an extended position away from the bar 49, and, as shown, consists of a spring 61 engaging at one end the bar 49, and at the opposite end engaging the bell crank 56 in a manner to normally urge the bell crank to hold the tension member 40 in a position in which the clutch is disengaged. It will be appreciated under this arrangement that any rotation of the coil E requires that the operator depress the push bar 44 and that as soon as any pressure is released upon the push bar, the clutch is disengaged and the coil E immediately stops rotating. This particular arrangement becomes extremely useful in the operation contemplated by this invention inasmuch as any release of the pressure upon the clutch is effective to stop operation.

I am aware that various expedients and mechanical equivalents may be substituted in the disclosure made herein and equal benefits obtained. It is, therefore, my intention that this disclosure shall include all such modifications and refinements that may take place from time to time in the employment of my invention that come within the scope of the specification and the essence of my invention as expressed in the appended claims.

I claim as my invention:

1. An apparatus for connecting coiled spring members by means of a continuous helical coil including: traveling power means for rotating said helical coil in a manner to cause it to encircle end portions of said coiled springs; and means operable to control the rotation of said helical coil.

2. An apparatus for connecting coil spring members by means of a continuous helical coil embodying: a traveling source of power adapted to rotate said helical coil; a clutch associated with said source of power; and means for remotely controlling said clutch.

3. An apparatus for connecting coil spring members by means of a continuous helical coil embodying: a traveling source of power adapted to rotate said helical coil; track means for mounting said traveling source of power; a clutch associated with said source of power; and pressure means for remotely controlling said clutch.

4. An apparatus for connecting coil spring members by means of a continuous helical coil embodying: a table for arranging said coil spring members; a track associated with said table; power means adapted to ride said track and rotate said helical coil; clutch means associated with said power means; and means mounted upon said table for remotely controlling said clutch.

5. An apparatus for connecting coil spring members by means of a continuous helical coil embodying: a table having means thereon for arranging said coil spring members; a track associated with said table; means for moving said track relative to said table; power means arranged to rotate said helical coil and adapted to ride said track; a clutch associated with said power means; pressure means mounted upon said table and arranged to control said clutch by means of a flexible connection.

6. An apparatus for connecting coil spring members by means of a continuous helical coil embodying: a table having means thereon for arranging said coil spring members; a track associated with said table; means for moving said track relative to said table; power means arranged to rotate said helical coil and adapted to ride said track; a clutch associated with said power means; pressure means mounted upon said table and arranged to control said clutch by means of a flexible connection, said pressure means embodying a push bar arranged on said table in a manner to be operably engaged by the body of an operator at any point on said bar.

7. In a power actuated apparatus for connecting coil spring members by means of a continuous helical coil; means for mounting said power actuating means in a manner to rotate said helical coil and to be simultaneously moved by said coil in unison with the advance of said coil; and means for controlling the rotation of said coil.

In testimony whereof, I have hereunto set my hand at Chicago, Illinois, this 24th day of January, 1930.

CHARLES LOFMAN.